Patented Oct. 17, 1939

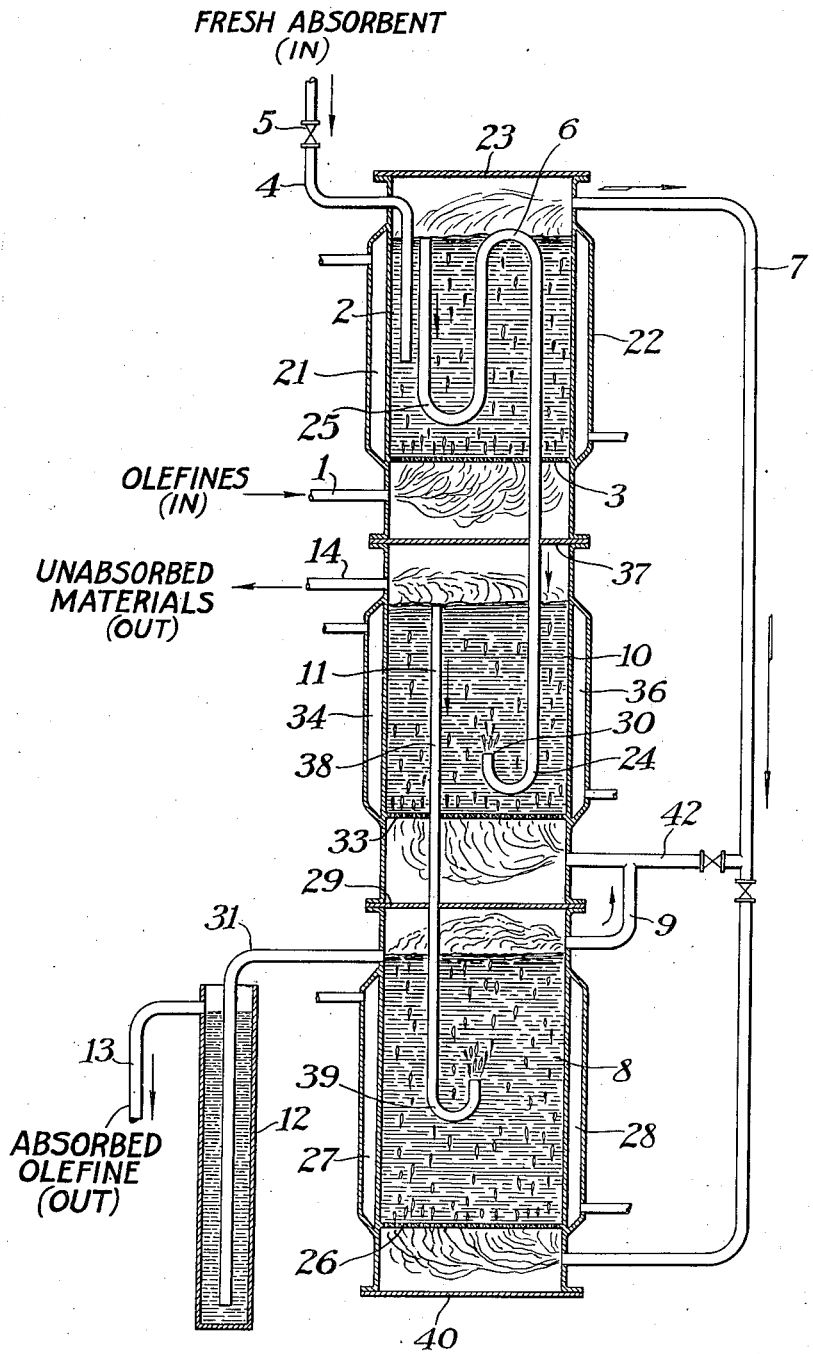

2,176,496

UNITED STATES PATENT OFFICE 2,176,496

PROCESS AND APPARATUS FOR ABSORBING OLEFINS

Rudolph Leonard Hasche, Kingsport, Tenn., assignor to Eastman Kodak Company, Rochester, N. Y., a corporation of New Jersey Application September 4, 1936, Serial No. 99,438

7 Claims. (Cl. 260—460)

This invention relates to processes and apparatus for absorbing unsaturated hydrocarbons, and more particularly, to a continuous process and apparatus for absorbing olefins, such as ethylene, existing in the form of a gaseous mixture with other materials.

There are a number of uses and demands for a satisfactory and efficient process and apparatus for removing and recovering the olefin hydrocarbons. In some instances there are mixtures from which it is desirable to remove the olefins before employing the other components of the mixture. For example, this is desirable in the process described in copending application Hasche Serial No. 76,239. In some of the synthetic processes for preparing alcohols one of the steps comprises absorbing olefins in various mediums such as sulfuric acid. It is with these types of absorption processes and others that my invention is particularly concerned.

In accordance with certain prior art processes it has been customary to merely pass the olefin materials through towers filled with absorbent. However, such procedure is not particularly efficient. In one instance an attempt has been made to keep the absorbent of a definite composition by regulated additions of the necessary agent. In another instance a plurality of absorption units have been employed operating batchwise and intermittently.

One object of my invention is to provide an efficient continuous process for the absorption of olefinic hydrocarbon materials. Another object is to provide a continuous process for the absorption of olefins existing in the form of mixtures with other materials. Still a further object is to provide a continuous process for converting olefins, such as ethylene, propylene and butylene into the corresponding sulfates. Another object is to provide a process for separating ethylene and other olefins existing in the form of an admixture. Still a further object is to provide a continuous process for the substantially complete removal of the olefins contained in a gaseous mixture. Another object is the more complete utilization of the acid absorbent.

Still another object is to provide a novel apparatus for carrying out the absorption of olefin materials in a continuous manner. A further object is to provide an apparatus wherein the temperature and composition of the olefin absorbent may be controlled, regulated and changed. Other objects will appear hereinafter.

These objects are accomplished by my novel process and apparatus wherein olefinic materials can be substantially separated and recovered by an olefin absorbent, in a continuous manner. Olefin absorbents may take up olefin materials in a varying rate. That is, an olefin absorbent in a substantially pure condition may be less active than when in a partially saturated condition.

I have found that by utilizing this varying absorbent activity in accordance with my novel process and apparatus to be described in detail hereinafter that olefin materials may be substantially and efficiently removed and recovered even when in admixture with other materials.

My novel method of operation and apparatus may be better understood by reference to the accompanying drawing which forms a part of the present application.

The accompanying drawing is a semi-diagrammatic side elevation view showing one form of my apparatus set up for continuously and efficiently absorbing olefinic materials. Certain parts of the figure have been shown in exaggerated scale and on section for clarity.

In the accompanying drawing, 1 represents the feed inlet for the material to be treated. This feed inlet or conduit leads to a point somewhere below one of a number of absorbing sections. This absorbing section is defined by the perforated plate 3, jacketed walls 21 and 22 for temperature control and top closure 23.

This absorption section includes the inlet 4. This inlet may extend more or less into the interior of the absorbing section for the purpose of displacing absorbent therefrom in a manner more apparent as the description proceeds. A valve or other means designated 5 is provided in the inlet or conduit 4 for the purpose of controlling the flow. The absorption section 2 is provided with an overflow 6. Preferably this overflow will have goosenecks, traps or other devices designated 24, 25 for the purpose of preventing any gas backing up in the system.

An outlet conduit designated 7 is provided for conducting unreacted materials from absorption section 2 to another absorption section designated 8. Section 8 is similar in a number of respects to the section just described and includes the perforated plate 26 jacketed sidewalls 27, 28 and a top or other type of closure 29. An external overflow 31 leads from section 8 to the sealing and storage vessel 12 which is provided with a drawoff 13.

Section 8 is connected by an offtake conduit 9 through which the unreacted materials may pass to section 10. Section 10 is similar to the other absorbing sections which have been described and comprises a perforated plate 33 jacketed walls 34, 36, and a top 37. An overflow 38 leads from section 10 to section 8. This overflow is provided with a trap or gooseneck designated 39 for preventing the back passage of gases in the system. Section 10 may be connected to line 7 by means of the valved conduit 42.

In my preferred embodiment I prefer to position one absorbing section above another supporting the group on the base 40. By this arrangement flow of the liquids takes place to a large extent by gravity, hence, eliminates pumps and other devices. However, other types of arrangement could be employed employing pumps as long as the flow of absorbent is in accordance with and comparable to that shown, namely, from section 2 to section 10 and then to section 8. The olefin flow is through section 2, then 8 and finally through 10. It is also apparent that in place of jackets for controlling the temperature other devices might be employed, such as coils extending into the sections.

The absorbing sections, feed conduits and other parts which may come in contact with corrosive materials are constructed of properly resistant materials. The plates may be constructed of perforated stainless steel, stainless steels of the chrome nickel plate containing about 8%–30% of chromium, 6–20% of nickel, the balance substantially iron with or without small amounts of copper, molybdenum, tungsten and similar elements. It is also possible to employ certain types of porous tile, ceramics, or the like. Certain grades of iron silicon alloys are also suitable. Also these materials may be employed in constructing various other parts of the apparatus.

As already indicated above, the olefin absorbent mediums may vary in their activity for taking up the olefins. For example, in the instance of absorbing ethylene in ordinary commercial sulfuric acid, the sulfuric acid without any ethylene absorbed therein does not evidence as great an activity as sulfuric acid having a moderate amount of ethylene dissolved therein. Likewise, sulfuric acid saturated with ethyl hydrogen sulfate, or even containing large quantities thereof, possesses less activity than sulfuric acid with an intermediate content of ethyl hydrogen sulfate.

With this property in mind, my novel process may be better understood by the following example described as carried out in an apparatus of the type shown in the accompanying drawing. This example is set forth merely for the purposes of illustration and is not to be construed as limiting my invention.

An olefin containing gaseous mixtures, such as, for example, a mixture containing about 10–60% of ethylene, about 10–70% of acetylene, the balance being comprised of methane, hydrogen, nitrogen, carbon monoxide and the like, is passed into my apparatus through feed conduit 1.

Ordinary sulfuric acid of about 1.84 specific gravity is continuously fed into my apparatus at 4 so absorbing section 2 is filled and overflows through conduit 6. The temperature of this absorbing section, as well as the other absorbing sections, is preferably maintained at about 70° C. to about 100° C. by circulation of some medium in the temperature controlling jackets 21, 22, etc. The ethylene and other materials therewith pass through perforated plate 3 which breaks the gas up into a number of small gas bubbles which pass through the sulfuric acid contained in absorbing section 2. A part of the ethylene is absorbed forming ethylene hydrogen sulfate.

As already indicated, when sulfuric acid contains some moderate amount of ethyl hydrogen sulfate, but not sufficient to saturate, the absorbing activity of sulfuric acid is improved. However, approximately when this condition obtains, or slightly before, the absorbing liquid in section 2 can be caused to overflow through conduit 6 to section 10. That is, fresh sulfuric acid supplied through conduit 4 displaces liquid from absorbing section 2. By controlling the rate of flow through 4 and extending the conduit properly into the absorbing section as well as constructing the absorbing section of the proper size for the particular absorbent being used, it is possible to let the sulfuric acid remain in the absorbing section for a proper length of time to build up a content of ethyl hydrogen sulfate therein to a point giving the most efficient absorbing action.

The off gases containing some unreacted ethylene pass out through conduit 7 to absorbing section 8, which it will be observed hereinafter contains sulfuric acid with a high content of, or saturated with, ethyl hydrogen sulfate. Hence, as indicated above, the absorbent in this section is not in the most active state. Section 8 is maintained at the proper temperature by means of jackets 27, 28 and in the passage of the ethylene containing gases therethrough further quantities of ethylene are removed.

From section 8 the off materials which are now depleted to a substantial extent of olefin, then pass through conduit 9 to section 10. Section 10 contains sulfuric acid having a moderate or intermediate ethyl hydrogen sulfate content and is a very active absorbent agency. In section 10 the residual ethylene content is substantially entirely taken up before the gas is conducted away through conduit 14 for other uses.

The very efficient absorbent in section 10 of sulfuric acid and moderate amount of ethyl hydrogen sulfate tends to build up in ethyl hydrogen sulfate and thereby become less active. However, before or at about the time this condition would occur, the absorbing liquid overflows through conduit 38 into section 8. This overflow is caused by a continuous flow of the active agent from section 2 through conduit 6 into section 10.

Referring now to section 8 the liquid therein which contains a substantial or large quantity of ethyl hydrogen sulfate is withdrawn through conduit 31 into the sealed vessel 12. This vessel balances the flow and seals the overflow to prevent gas escape. From vessel 12 the ethyl hydrogen sulfate liquid may be withdrawn through conduit 13 to be used for whatever purpose is desired. For example, this liquid may be hydrolyzed to give ethyl alcohol which may be recovered by distillation, and sulfuric acid which may be concentrated and reused by feeding in through conduit 4.

My process employing commercial sulfuric acid gives an excellent overall absorption efficiency. The process is continuous and a high rate of absorption is obtained by my novel procedure of passing the gas containing ethylene through a series of three absorbing sections which contain sulfuric acid with varying concentrations of ethylene hydrogen sulfate.

In my preferred procedure the inlet gas or the gas richest in ethylene comes in contact with the freshest sulfuric acid, i. e. sulfuric acid with the smallest concentration of ethyl hydrogen sulfate. The gas then enters another absorbing section and passes through a sulfuric acid containing a larger and generally the maximum concentration of ethyl hydrogen sulfate. The gas is then passed through an absorbing section containing sulfuric acid within the maximum absorbing capacity range to remove substantially all of the ethylene from the gas.

In the example under description the off gases at 14 may be employed as described in the above referred to copending application.

While the process as above described shows the preferred way of utilizing sulfuric acid in olefin hydration, a slightly less efficient but a simpler method of operation may be provided for. For instance, in conduit 42 the opening of the valve will allow the ethylene to pass first through acid of low ethyl hydrogen sulfuric content; consequently, low absorption capacity, and then through acid of maximum capacity. While the acid would not be quite as completely utilized, it would still be commercial. It will be noted that by operating with only the two sections, as just described, the flow of gas with respect to the flow of the liquid is continuous and concurrent.

While I have shown ordinary (about 1.8-1.84) sulfuric acid as the absorbent medium and find that this medium when used as I have described gives a very high over all absorption efficiency, various other absorbing mediums may be employed. For example, sulfuric acid containing silver salts, copper salts, and the like, may be employed for taking up the olefin content.

Although I have described my process for removing ethylene, my process may be successfully employed for recovering propylene, butylene and other olefins by operation under proper conditions. For ethylene absorption, temperatures in the neighborhood of 60-85° C. are satisfactory. For absorbing the higher olefins, a temperature of less than 30° C. is satisfactory. In treating mixtures containing not only ethylene but higher olefins, the various olefins may be recovered and separated by employing two of my novel units in series, that is, the mixture would first pass through three absorbing sections as already described operated at temperatures lower than 30° C. for removing the higher olefins. The materials would then be passed through the next unit of three absorbing sections for removal of the ethylene.

While I have described my invention as applied to mixtures of olefins with other materials my invention may be applied with equal success to materials comprised principally or entirely of olefin.

Although I have shown and described certain specific embodiments of my invention, I am fully aware that many modifications thereof are possible. Hence, my invention is not to be restricted except insofar as is necessitated by prior art and by the spirit of the appended claims.

What I claim as my invention and desire to secure by Letters Patent of the United States is:

1. In a continuous process for absorbing ethylene existing in the form of a mixture with acetylene containing materials by means of a sulfuric acid absorbent, the steps which comprise continuously passing an ethylene and acetylene mixture through a series of sulfuric acid absorbents in a state of activity less than maximum, and then passing the off ethylene and acetylene materials through sulfuric acid absorbent containing a content of ethyl hydrogen sulfate in the range of from about 30-65 mols of ethylene per mols of sulfuric acid.

2. A continuous process for converting ethylene to ethyl sulfates, which comprises passing ethylene through a liquid composed principally of sulfuric acid containing some ethyl hydrogen sulfate and maintained at a temperature between about 60° C. and 100° C., continuously supplying sulfuric acid to this liquid whereby a part of the sulfuric acid and ethyl sulfate liquid is displaced, substantially continuously conducting the off ethylene materials from the first treatment into contact with further quantities of sulfuric acid containing ethyl hydrogen sulfate, and then substantially continuously passing the off ethylene materials from this latter treatment into contact with the aforementioned displaced liquid.

3. A continuous process for absorbing ethylene in sulfuric acid absorbents, which comprises preparing three sections containing sulfuric acid absorbents, continuously supplying sulfuric acid to the first section in a manner whereby sulfuric acid absorbent of the first section is caused to flow by gravity to the second section and sulfuric acid absorbent in the second section is caused to flow by gravity to the third section, simultaneously passing ethylene to the first section, passing the off ethyelne from the first section to the third section, and then passing the off ethylene from the third section to the second section.

4. A continuous process for absorbing ethylene in a sulfuric acid absorbent, which comprises preparing at least two sections of sulfuric acid absorbents, continuously supplying sulfuric acid to the first section in a manner whereby absorbent from the first section is caused to flow into another section by displacement and gravity, simultaneously passing ethylene gas into the first section, conducting the off ethylene gas from the treatment in the first section to other treatment in another section, said other treatment including counter-current contact with absorbent from the first section.

5. An apparatus for the continuous absorption of olefins in accordance with the process specified in claim 2, which comprises a first, second and third absorbing section provided with perforated plates, feed conduits leading to the vicinity of the first section, a conduit joining the first section with the third section at a position below the perforated plate, another conduit connecting the third section with the second section, and an outlet conduit leading from the third section.

6. An apparatus for the continuous absorption of olefins which comprises a first, second and third absorbing section arranged in series and provided with perforated base plates, a conduit leading to the vicinity of the perforated plate of the first section, another conduit leading into the first section, external conduit means connecting the first section with the third section, other external conduit means connecting the third section with the second section, internal conduits connecting the first, second and third sections in series, and an outlet conduit from the second section.

7. An apparatus for the continuous absorption of olefins in accordance with the process specified in claim 3, which comprises a first, second and third absorbing section in series, feed conduits leading to the apparatus, conduit means connecting the first section with the third section, other conduit means connecting the third section with the second section, and outlet conduits leading from both the third and the second sections.

RUDOLPH LEONARD HASCHE.